(12) United States Patent
Riegger et al.

(10) Patent No.: US 11,518,047 B2
(45) Date of Patent: Dec. 6, 2022

(54) ROBOT HAVING COMPLEMENTARY FASTENING ELEMENTS FOR CONNECTING ASSEMBLIES

(71) Applicant: FRUITCORE ROBOTICS GMBH, Constance (DE)

(72) Inventors: Jens Robert Riegger, Constance (DE); Manuel Tobias Frey, Constance (DE); Johannes Füssl, Constance (DE)

(73) Assignee: Fruitcore Robotics GmbH, Constance (DE)

( * ) Notice: Subject to any disclaimer, the term of this patent is extended or adjusted under 35 U.S.C. 154(b) by 0 days.

(21) Appl. No.: 17/278,521

(22) PCT Filed: Sep. 6, 2019

(86) PCT No.: PCT/EP2019/073810
§ 371 (c)(1),
(2) Date: Mar. 22, 2021

(87) PCT Pub. No.: WO2020/064302
PCT Pub. Date: Apr. 2, 2020

(65) Prior Publication Data
US 2021/0308877 A1    Oct. 7, 2021

(30) Foreign Application Priority Data
Sep. 24, 2018 (EP) .................................... 18196270

(51) Int. Cl.
*B25J 17/00* (2006.01)
*B25J 9/00* (2006.01)

(52) U.S. Cl.
CPC ............. *B25J 17/00* (2013.01); *B25J 9/0009* (2013.01)

(58) Field of Classification Search
CPC . B25J 9/009; B25J 9/0009; B25J 9/045; B25J 9/046; B25J 9/08; B25J 17/00; B25J 17/0241
(Continued)

(56) References Cited

U.S. PATENT DOCUMENTS

| 4,949,586 A * | 8/1990 | Akagawa ............. B25J 17/0241 74/96 |
| 5,540,541 A | 7/1996 | Gosdowski et al. |

(Continued)

FOREIGN PATENT DOCUMENTS

| CN | 103264389 A * | 8/2013 |
| CN | 207710822 U | 8/2018 |

(Continued)

OTHER PUBLICATIONS

International Preliminary Report on Patentability dated Feb. 15, 2021, in corresponding International Application No. PCT/EP2019/073810 (5 pages).

(Continued)

*Primary Examiner* — Bobby Rushing, Jr.
(74) *Attorney, Agent, or Firm* — Fitch, Even, Tabin & Flannery LLP

(57) ABSTRACT

A robot 1 having a first assembly 4, 5 and a second assembly 3, 6, wherein a bearing arrangement 24, 25, 52, 53, by which the second assembly 3, 6 can be moved relative to the first assembly 4,5 is provided in the first assembly 4,5. The bearing arrangement 24, 25, 52, 53 comprises a first fastening element 26, 27, 54, 55, and the second assembly 3, 6 comprises a second fastening element 30, 31, 60, 61, wherein the first fastening element 26, 27, 54, 55 and the second fastening element 30, 31, 60, 61 are connected to one another, and wherein the first fastening element 26, 27, 54, 55 and the second fastening element 30, 31, 60, 61 are (Continued)

designed to be complementary, at least in sections. A method for mounting two assemblies 2, 3, 4, 5, 6, in particular two robotic arms, of a robot is also disclosed.

10 Claims, 3 Drawing Sheets

(58) Field of Classification Search
USPC .......................................................... 901/28
See application file for complete search history.

(56) References Cited

U.S. PATENT DOCUMENTS

| | | | |
|---|---|---|---|
| 2008/0129239 A1 | 6/2008 | Lee et al. | |
| 2014/0047940 A1* | 2/2014 | Yamamoto | B25J 9/0009 |
| | | | 74/490.05 |
| 2017/0095936 A1* | 4/2017 | Fukuoka | B25J 18/04 |
| 2017/0341226 A1 | 11/2017 | Wang et al. | |

FOREIGN PATENT DOCUMENTS

| | | | | |
|---|---|---|---|---|
| JP | 6215488 U | | 1/1987 | |
| JP | S6292179 U | | 6/1987 | |
| JP | 10166286 A | | 6/1998 | |
| JP | 2011255367 A | * | 12/2011 | ........... H05K 5/0008 |
| JP | 2013056419 A | | 3/2013 | |
| SE | 524549 C2 | * | 8/2004 | ........... H05K 5/0008 |

OTHER PUBLICATIONS

International Preliminary Report on Patentability dated Feb. 15, 2021, in corresponding International Application No. PCT/EP2019/073810, with machine English translation (37 pages).

International Search Report and Written Opinion dated Oct. 10, 2019, in corresponding International Application No. PCT/EP2019/073810, with machine English translation (17 pages).

Extended European Search Report dated Apr. 10, 2019, in corresponding European Application No. 18196270.5, with machine English translation (20 pages).

Office Action in corresponding Japanese application JP 2021-516799 dated Jul. 19, 2022, 3 pages.

* cited by examiner

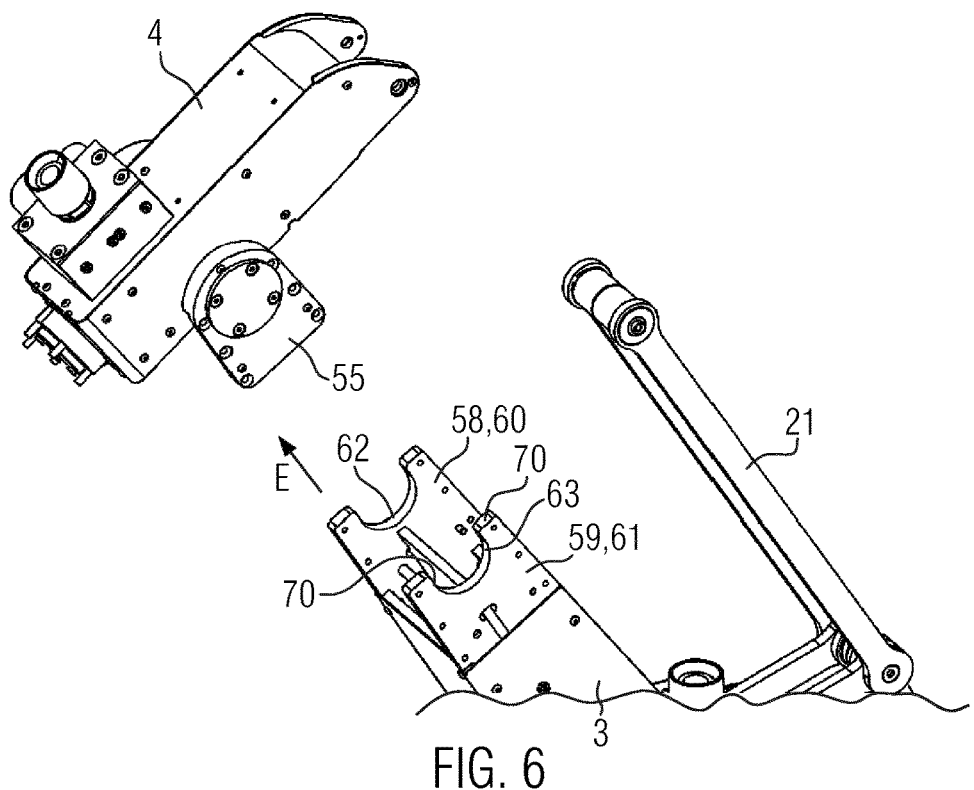
FIG. 6
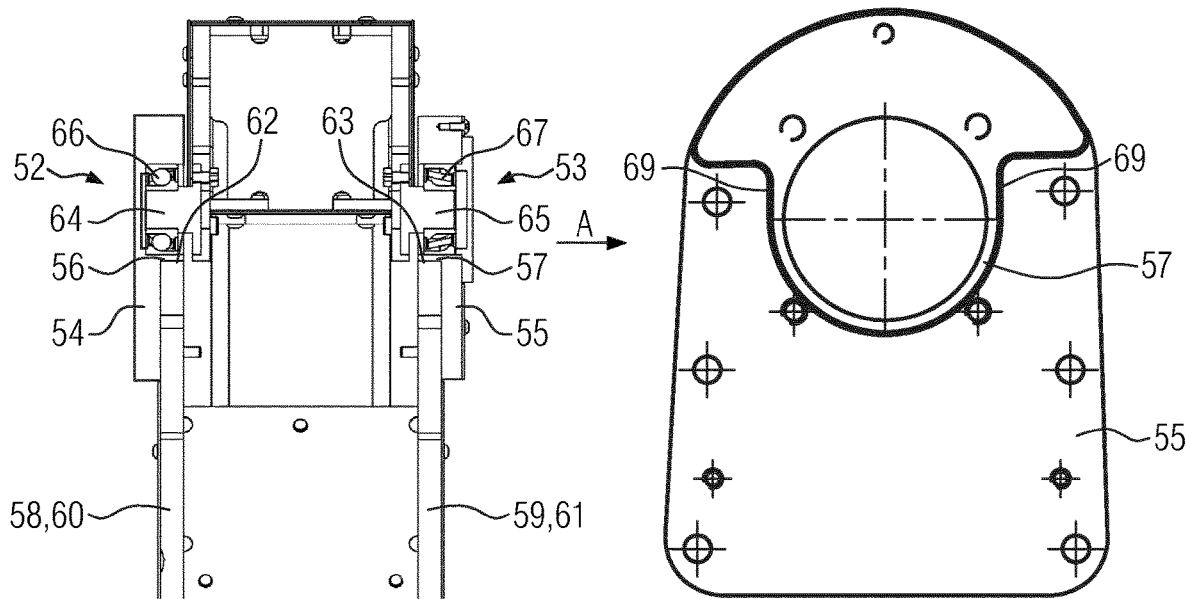
FIG. 7
FIG. 8

ROBOT HAVING COMPLEMENTARY FASTENING ELEMENTS FOR CONNECTING ASSEMBLIES

CROSS REFERENCE TO RELATED APPLICATIONS

This patent application is the national phase of PCT/EP2019/073810, filed Sep. 6, 2019, which claims the benefit of European Patent Application No. 18196270.5, filed Sep. 24, 2018.

TECHNICAL FIELD

The present invention relates to a robot having a first assembly and a second assembly, wherein a bearing arrangement by which the second assembly can be moved relative to the first assembly is provided in the first assembly. The invention also relates to a method for mounting two assemblies, in particular two robotic arms, of a robot.

BACKGROUND

For the connection of assemblies of robots during the assembly or as part of maintenance work, bearings often have to be inserted and installed during the assembly. This leads to a complex assembling process with many individual parts that have to be positioned precisely relative to one another. Alternatively, the bearings can be firmly integrated into one of the two assemblies. However, this then requires very precise relative positioning of the assemblies, wherein in particular the axes of rotation in the various assemblies need to be aligned precisely with one another. Consequently, a difficult assembling process likewise arise.

An arm for a humanoid robot is known from CN 207 710 822 U comprising a servo drive unit with rotatable disks which are fastened to a connection member of an adjacent assembly.

SUMMARY

The invention has the object of enabling a simplified assembling process of a robot while nevertheless ensuring a high level of precision in the alignment of the assemblies that can be moved relative to one another.

The invention provides a robot having a first assembly and a second assembly, wherein a bearing arrangement by which the second assembly can be moved relative to the first assembly is provided in the first assembly, wherein, according to the invention, the bearing arrangement comprises a first fastening element and the second assembly comprises a second fastening element, wherein the first and second fastening elements are connected to one another, in particular in a releasable manner, and wherein the first and second fastening elements are designed to be complementary in sections. This enables the first and second assemblies to be mounted quickly and easily to one another. Each assembly can be provided as a preassembled component and easily and quickly joined using the fastening elements to form an overall assembly. Fastening by way of the fastening elements that are complementary at least in sections enables a rigid bearing arrangement free from play to be provided for the relative motion of the assemblies, which furthermore enables the assemblies to be precisely aligned relative to one another.

Few or no additional parts then need to be introduced during the assembling process of the two assemblies, in particular since the bearing arrangement is already installed into the first assembly.

In addition, due to the fastening elements being complementary in sections, complex alignment of the two assemblies or of the individual fastening elements, respectively, relative to one another can be dispensed with since the complementary formation defines the relative positions of the fastening elements to one another. This also enables the fastening elements and therefore the assemblies to be self-centering, in particular if the bearing arrangement is a pivot bearing arrangement about a specific axis.

The bearing arrangement is advantageously configured in such a way that the first fastening element is mounted to be rotatable in the first assembly. This rotatable bearing arrangement can be provided in particular with a drive so that the second assembly can be rotated in a controlled manner relative to the first assembly. For this purpose, a sensor can also be provided in the bearing arrangement and provide to a control unit a feedback signal, in particular with regard to the relative rotation of the assemblies.

In one embodiment, the first and second fastening elements can be inserted into one another. In particular, the fastening elements can be inserted into one another until the complementary surfaces contact one another. For example, a stop can be provided which restricts the insertability in the desired position.

The first or second fastening element advantageously is or forms a receptacle and the other of the first and second fastening elements is a projection, wherein the projection for fastening is inserted into the receptacle in a direction of insertion. Due to their complementary shape, the projection and the receptacle enable a play-free fit and precise positioning of the fastening elements. In particular, the first fastening element forms a receptacle and the second fastening element forms a projection. In other embodiments, the second fastening element forms a receptacle and the first fastening element forms a projection. The projection protrudes in particular beyond a lateral or inner surface of the respective assembly, wherein the projection in other embodiments can also be provided in a recessed region.

In one embodiment, a pretensioning element is provided with which a pretension can be applied onto the projection in the direction of insertion. The pretensioning element is in particular a pretensioning plate, a pretensioning sleeve or a pretensioning bracket which acts with a pretension upon the projection. The pretension can be provided, for example, by resilient elements, screws, or clips. In particular, the pretensioning element can complete the complementary shape of the receptacle, so that the receptacle and the pretensioning element are circumferentially substantially complementary to the projection. The pretensioning element makes it possible, in particular, for the fastening elements to be positioned precisely and held securely relative to one another.

The receptacle can be in particular a guide and the projection can be a rail. The complementary shape can there be, for example, only in the plane normal to the direction of insertion so that free positioning along the direction of insertion is possible. Alternatively, however, a stop or another likewise complementary shape can be provided which uniquely defines the positioning between the guide and the rail in the direction of insertion.

In one embodiment, the projection is formed at least in sections to have the shape of a graduated circle and the receptacle at least in sections the shape of an arc. If the projection having the shape of a graduated circle and the complementary receptacle having the shape of the arc are now made to contact one another, then this primarily defines the translational positioning between the fastening elements or assemblies, respectively, wherein rotatory fine adjustment can still be possible. Alternatively, however, a stop additionally defining the rotatory position can also be provided. The stop can be formed in particular by an abutment surface extending in a manner deviating from the circumferential direction of the arc, for example, by a surface in the tangential direction that directly adjoins the arc.

In one embodiment, the projection can be formed to be conical in the direction of insertion. This enables the projection to be easily inserted into a correspondingly configured complementary receptacle and a secure fit of the projection in the receptacle when they have fully contacted one another. In addition, the position of the projection in the receptacle is precisely predetermined.

In one embodiment, the first assembly is a first robotic arm and the second assembly is a second robotic arm, wherein the second robotic arm is connected to the first robotic arm in a manner pivotable about a pivot axis extending in the axial direction of the bearings. Alternatively, the first assembly or second assembly can also be a base or gripper of a robot, and the other of the first and second assembly can be a robotic arm, wherein the assemblies are each connected to one another rotatable or pivotable in a relative manner. It is then possible to use the releasable fastening according to the invention between all components or assemblies, respectively, of a robot, wherein the employment is advantageously on the axes of the robot.

In particular, the fastening elements can be inserted into one another substantially orthogonally to the pivot axis. This enables space-saving and ergonomic mountability of the robotic arms.

The bearing arrangement advantageously comprises at least one shaft mounted in the first robotic arm to be rotatable about the pivot axis, wherein the first fastening element is fastened on the shaft or is formed integrally and in one-piece therewith, and the second fastening element is provided in the second robotic arm. The first fastening element can then be co-rotated with the shaft, as a result of which a motion of the second robotic arm relative to the first robotic arm can be enabled or effected. For this purpose, the shaft mounted to be rotatable can in particular be driven and/or be provided with a rotation sensor, so that a controlled motion of the robotic arms relative to one another is possible. The first fastening element and its projection can be formed in particular by the shaft if the receptacle provides a shape that is complementary to the shaft at least in some sections. This is particularly useful for large shaft diameters and hollow shafts since the force-fit connection can then reliably prevent a relative rotation between the shaft and the receptacle.

In one embodiment, the robotic arm is configured at one end with two jaws extending in parallel and at a distance, wherein the second robotic arm is mounted between these jaws and shafts mounted to be rotatable are provided coaxially in both jaws. A region is then provided between the jaws in which the second robotic arm can be arranged and fastened.

A first fastening element is advantageously provided on each of the rotatably mounted shafts and can engage in a fastening element on both sides of the second robotic arm. In particular, one or both of the shafts can be displaced in the axial direction in order to apply a pretension onto the respective bearing arrangement of the shafts. Each shaft can be supported statically undefined only with one respective pivot bearing, so that a rotating body, comprising the two shafts and the second robotic arm, mounted in a statically defined manner is only formed by providing the second robotic arm. The second robotic arm and the shafts can thus form a joint rotating body. The shafts can therefore each only be mounted with one bearing and defined mounting of the shafts is only made possible by introducing and fastening the second robotic arm. Alternatively, mounting of both shafts in a statically defined manner is also possible with two pivot bearings each or a double-row pivot bearing, in particular with two sets of rolling elements arranged axially adjacent to one another, e.g. in the form of a double angular ball bearing.

In another embodiment, the second robotic arm can be configured at one end with two jaws extending in parallel and at a distance, wherein the first robotic arm is mounted between these jaws and the two ends of at least one shaft mounted to be rotatable in the first robotic arm are provided coaxially on both outer sides of the first robotic arm. In particular, the shaft mounted to be rotatable in the first robotic arm can be configured integrally or comprise two shafts provided independently of one another on the respective two outer sides of the robotic arm. In the latter case, mounting the shafts in a statically defined manner can respectively be achieved again only by fastening the shafts to the second robotic arm.

The at least one shaft can advantageously be configured as a hollow shaft and at least one cable and/or at least one fastening screw can be passed through the interior of the hollow shaft. This allows for a compact design and also for protection of the cables which can be provided for actuating the various motors, reading out sensors, and/or for powering and controlling an end effector.

The present invention therefore enables the bearing pretension to be easily adjusted. In addition, a restriction in the rotational motion can be prevented with the configuration according to the invention. Fastening the assemblies is maintenance-free and can easily be disassembled for maintenance of other components and then reassembled. In addition, a bearing pretension can be set, which is then constant over an operational life. Fastening the modules to one another according to the invention is also characterized by a high degree of rigidity.

The first and/or second assembly are advantageously configured as a plate construction in which several parallel plates are attached to one another with spacers. The spacers can be provided in particular by further plates which are arranged orthogonally to the parallel plates. In particular, the parallel plates and the plates arranged orthogonally thereto are connected by slot toothing. Two plates for one assembly can be fastened parallel to one another on spacers, wherein the fastening elements are then provided axially outside in or on the plates. If the assembly is configured having jaws extending at a distance, then four parallel plates can be provided forming the respective lateral boundaries of the jaws. The fastening elements can then each be provided in or on the inner side of the inner plates. Alternatively, the jaws can also be formed by just one plate each. In addition, cover elements are employed for covering the open sides between the plates. The covers are arranged in particular orthogonally to the plates. The plates can then be used to define both the outer contour as well as the inner contour of the assemblies, in particular in the form of robotic arms.

The invention further relates to a method for mounting two assemblies, in particular two robotic arms, of a robot, wherein a first assembly is provided with a projection and a second assembly is provided with a receptacle, wherein either the projection is rotatable relative to the first assembly or the receptacle relative to the second assembly about a pivot axis. According to the invention, the projection is then inserted into the receptacle in a linear direction of insertion and the projection is fastened in the receptacle.

Fastening the projection in the receptacle can be done in particular by screws which extend orthogonally to the direction of insertion. Circular openings or bores provided in the receptacle and in the projection are aligned with one another for this purpose. In particular a stop or another complementary fastening element can be used for alignment.

Fastening the projection in the receptacle comprises in particular pretensioning in the direction of insertion. For this purpose, the projection can be configured to be complementary to the receptacle and the pretension can press the complementary components into one another in a fitting manner, so that a secure fit is obtained in a predefined position. In addition, freedom from play can be obtained through the pretension. Furthermore, however, it is also possible to apply further pretension after the insertion of the projection in the axial direction of the pivot axis in order to pretension its pivot bearing.

The assemblies can be provided pre-assembled for the method according to the invention, so that the assemblies only need to be a pushed together and fastened for assembling. For this purpose, the bearings for the pivot axis can in particular already be provided pretensioned or otherwise be pretensioned separately after the projection, in particular in the form of a rail, has been connected to the guide, in particular, in the form of a receptacle.

BRIEF DESCRIPTION OF THE DRAWINGS

The invention shall now be further described using exemplary embodiments which are illustrated in the following figures, where

FIG. 6 shows a perspective view of two assemblies of an embodiment of a robot according to the invention prior to the connection;

FIG. 7 shows a sectional view through the assemblies from FIG. 6 in the connected state; and FIG. 8 shows the fastening element from FIGS. 6 and 7 forming the projection.

DETAILED DESCRIPTION

Figure 1:
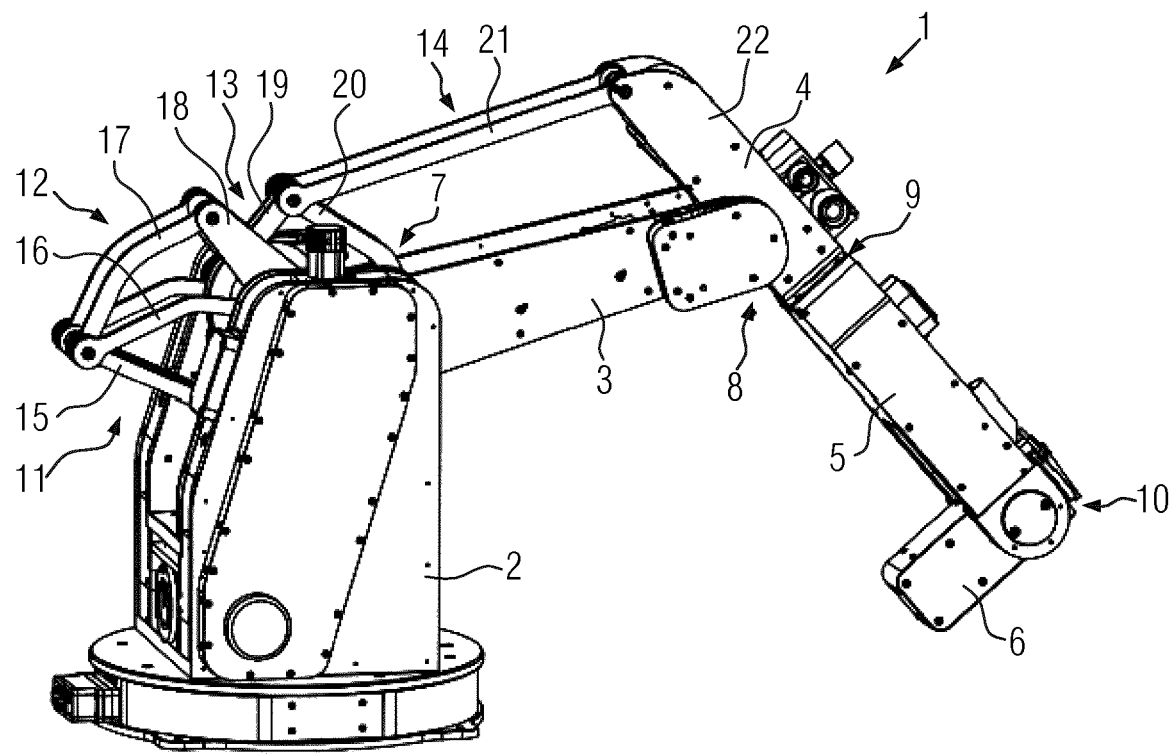
FIG. 1 shows a robot in which assemblies are connected according to an embodiment of the invention.
Figure 2:
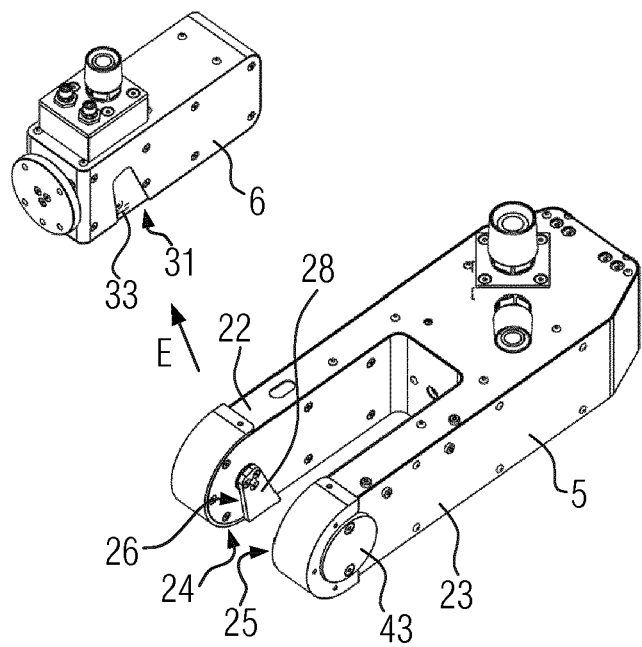
FIG. 2 shows a perspective view of two assemblies of an embodiment of a robot according to the invention before they are connected.

Robot 1 shown in FIG. 1 comprises several assemblies fastened to one another, namely a base 2 rotatable about the vertical axis, a pivot arm 3, an upper support arm 4, a lower support arm 5, and an articulated arm 6. Aforementioned arms 3, 4, 5, 6 are arranged in series according to a serial kinematics.

Robot 1 shown is a 6-axis robot. The vertical axis for the rotation of base 2 represents a first axis of robot 1. A first joint 7 defining a second axis of robot 1 is provided between base 2 and pivot arm 3. A second joint 8 defining a third axis of robot 1 is provided between pivot arm 3 and upper support arm 4. A third joint 9 defining a fourth axis of robot 1 is provided between upper support arm 4 and a lower support arm 5. The axis of rotation of third joint 9 is in the direction of extension of support arm 4, 5, so that support arm 4, 5 can be rotated in itself. A fourth joint 10 defining a fifth axis of robot 1 is provided between support arm 5 and articulated arm 6. An end effector in the form of gripper (not shown) or a different working element can be rotated relative to articulated arm 6 about a sixth axis of robot 1.

Joints 7, 8 enable pivot arm 3 and support arm 4, 5 to pivot about the respective substantially horizontal second and third axes of robot 1. The drive motors of third and/or fourth joint 9, 10 are provided directly or by way of a gear on the joints, as is the case with purely serial kinematics. The gear can be a drive belt.

The drive motions for first joint 7 and second joint 8 are each transmitted by way of four-bar linkages 11, 12, 13 and 14.

First four-bar linkage 11 and second four-bar linkage 12 are there arranged in series for transmitting a drive motion to pivot arm 3 so that the latter can be pivoted relative to base 2. First four-bar linkage 11 comprises a first crank that is hidden in FIG. 1 in base 2 and that can be pivoted by way of a first drive motor and is articulated to link 15 and accordingly drives link 15 of first four-bar linkage 11. Link 15 is articulated to rocker arm 16 of first four-bar linkage 11 and drives it. Rocker arm 16 at the same time forms the crank of second four-bar linkage 12 and is articulated to link 17 of second four-bar linkage 12 and drives it. Rocker arm 18 of second four-bar linkage 12 is rigidly connected to pivot arm 3 and co-rotates therewith during the latter's pivot motion. Rocker arm 18 and pivot arm 3 can be formed integrally. In particular, rocker arm 18 and pivot arm 3 form a rocker with respect to first joint 7. The crank of first four-bar linkage 11 can be flange-mounted by way of a drive shaft onto a motor or gear in base 2 in a manner non-displaceable in the axial direction. The gear can also be a drive belt or the like. Rocker arm 16 can likewise be mounted in base 2 in a manner non-displaceable in the axial direction. Finally, the bearing arrangement of rocker arm 18 in joint 7 can also be non-displaceable in the axial direction.

The drive motion for pivoting support arm 4, 5 relative to pivot arm 3 is transmitted to support arm 4, 5 by a second drive motor in base 2 by way of third four-bar linkage 13 and fourth four-bar linkage 14. The second drive motor pivots a crank of third four-bar linkage 13, which is arranged inside base 2 and can therefore not be seen in FIG. 1 and which is articulated to link 19 of third four-bar linkage 13 and drives it. Link 19 is articulated to rocker arm 20 of third four-bar linkage 13 and drives it. Rocker arm 20 is at the same time the crank of fourth four-bar linkage 14 which is articulated to link 21 of fourth four-bar linkage 14 and drives it. Rocker arm 22 and support arm 4 are rigidly connected in the form of a rocker with respect to second joint 8. Rocker arm 22 of fourth four-bar linkage 14 is in particular formed integrally with upper support arm 5. The crank of first four-bar linkage 13 can be flange-mounted by way of a drive shaft onto a motor or gear in base 2 in a manner non-displaceable in the axial direction. The gear can also be a drive belt or the like. Rocker arm 20 can be mounted in pivot arm 3 in a manner non-displaceable in the axial direction. Finally, the bearing arrangement of rocker arm 22 in second joint 8 can also be non-displaceable in the axial direction.

As shown in FIGS. 2 to 5, lower support arm 5 forms a first assembly which is connected to a second assembly in the form of articulated arm 6 according to an embodiment of robot 1 according to the invention, so that articulated arm 6 in lower support arm 5 is pivotable about a pivot axis in axial direction A.

Figure 3:
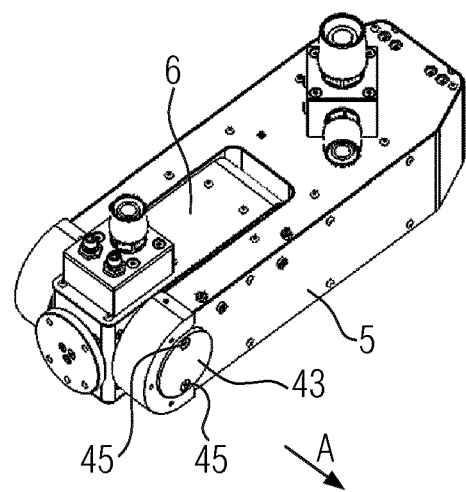
FIG. 3 shows the assemblies from FIG. 2 in a connected state.

Lower support arm 5 comprises outer jaws 22, 23. in each of which a bearing arrangement 24, 25 is provided which enables a first fastening element 26, 27 to be rotated about the pivot axis in axial direction A. First fastening element 26, 27 forms a projection 28, 29. Articulated arm 6 on each of its outer sides in axial direction A comprises a second fastening element 30, 31 which is configured as a receptacle 32, 33. First fastening element 26, 27 in the region of projection 28, 29 is configured to be complementary to receptacle 32, 33 of second fastening element 30, 31. Projection 28, 29 can therefore be arranged having a precise fit in receptacle 32, 33 in order to connect articulated arm 6 to lower support arm 5, as shown in FIG. 3.

Figure 4:
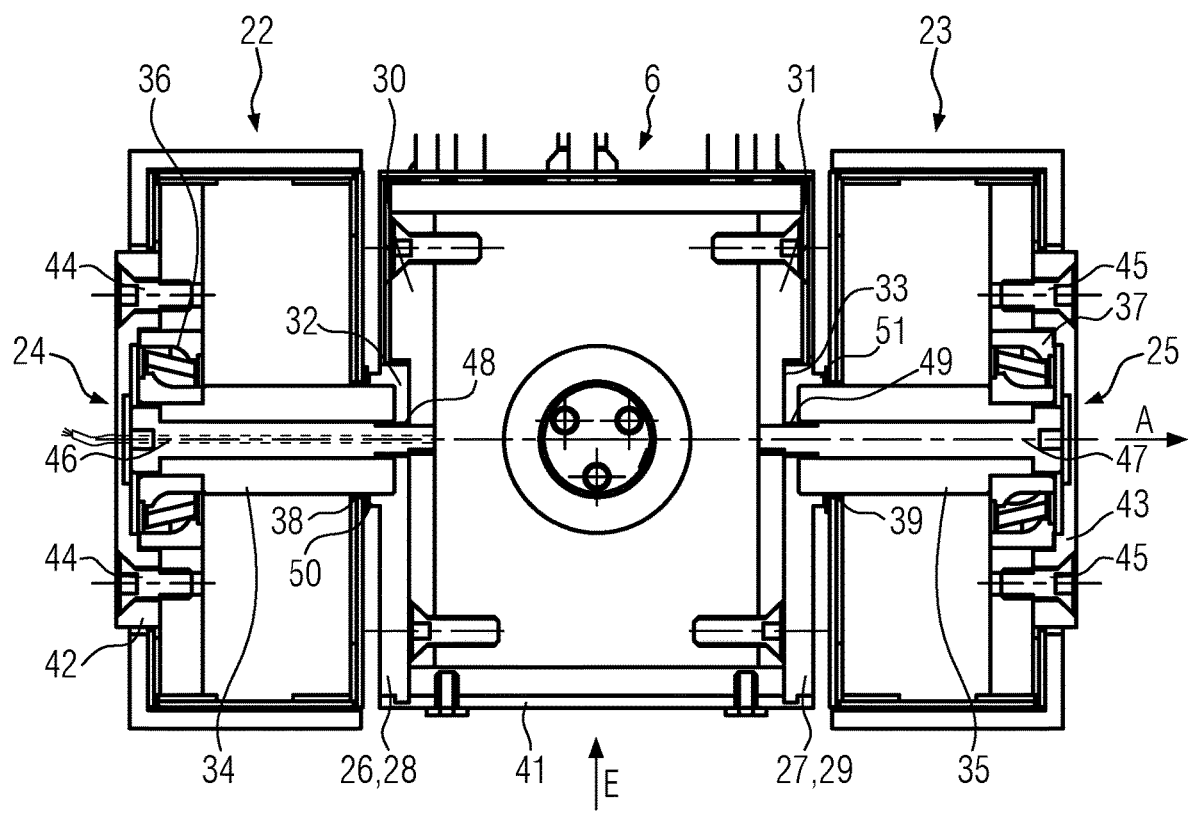
FIG. 4 shows a sectional view through the first and second assembly according to FIG. 3 in the region of the bearing arrangement.
Figure 5:
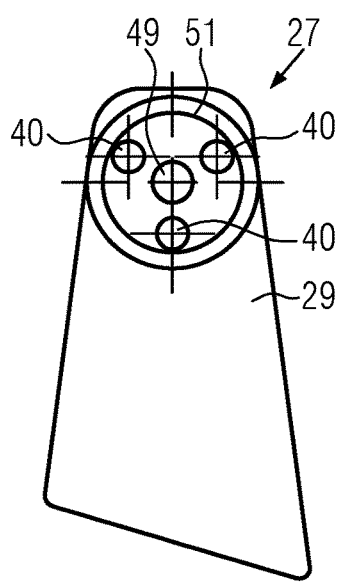
FIG. 5 shows the first fastening element of the bearing in the form of a projection.

According to the sectional view in FIG. 4, first fastening element 26, 27 is arranged on a shaft 34, 35 which is mounted to be rotatable in jaw 22, 23 of lower support arm 5. Shafts 34, 35 are there aligned with one another and rotatable coaxially in axial direction A. Each of shafts 34, 35 is supported by a pivot bearing 36, 37, in particular an angular rolling bearing, near the respective axial outer side of respective jaw 22, 23. Provided on the axial inner side of jaws 22, 23 is a respective cylindrical opening 38, 39 through which shaft 34, 35 protrudes axially towards the interior of jaws 22, 23. First fastening element 26, 27 is fastened to the axially inner end of shaft 34, 35, namely in particular by screwing through circular openings 40 shown in FIG. 5 which are provided along the circumference of the face side of shaft 34, 35 in shaft 34, 35 and in first fastening element 26, 27.

Once projections 28, 29 have been inserted entirely into receptacles 32, 33, a pretensioning element 41 in the form of a pretensioning plate is provided on articulated arm 6 by way of screws, so that first fastening element 26, 27 is pressed in direction of insertion E into receptacles 32, 33 of second fastening element 30, 31. In particular, pretensioning element 41 is in contact with the face sides of projections 28, 29, wherein a complementary configuration, for example in the form of a step, can there be provided so that not only force is applied to projections 28, 29 in direction of insertion E, but that securing and/or pretensioning of projections 28, 29 in axial direction A is also ensured.

A bearing bush 42, 43 can be provided in the region of the axially outer end of shaft 34, 35 and define the position of pivot bearings 36, 37 at least in axial direction A. In particular, the position of bearing bush 42, 43 can be set in axial direction A for adjusting the pretension of pivot bearings 36, 37. This is possible for the reason that shafts 34, 35 together with articulated arm 6 form an integrally rotatable unit. In particular, the pretension in axial direction A can be set in that the axial position of bearing bush 42, 43 is adjusted by way of screws 44, 45 with which bearing bush 42, 43 is fastened to lower support arm 5. In particular, bearing bush 42, 43 can be provided on only one side of lower support arm 5, wherein pivot bearing 36 can be received directly on the other side in support arm 5 not in a position-adjustable manner.

To fasten first fastening elements 26, 27 in second fastening elements 30, 31, a fastening screw 46, 47 can further be provided which extends centrally through shaft 34, 35 and is screwed into second fastening element 30, 31. An axially secure connection free of play between shaft 34, 35, first fastening element 26, 27, and second fastening element 30, 31 can thus be provided. In particular, fastening screw 46, 47 is passed through an opening 48, 49 in first fastening element 26, 27. First fastening element 26, 27 further comprises a circumferential web 50, 51 which has an inner diameter that corresponds to the outer diameter of the axially inner end of shaft 24, 25 and thereby enhances the secure connection of shaft 24, 25 to first fastening element 26, 27.

The connection of lower support arm 5 and articulated arm 6 is therefore configured such that the externally disposed assembly in the form of lower support arm 5 comprises a first fastening element 26, 27 with a projection 28, 29 which respectively provides a rail. The internally disposed assembly in the form of articulated arm 6 comprises second fastening element 30, 31, receptacle 32, 33 of which forms a guide. First fastening element 26, 27 is configured as a separate component, wherein it is rigidly connected to shaft 34, 35 when the assembly is mounted. Shaft 34, 35 is configured as a hollow shaft. For example, cables and/or fastening screws 46, 47 can be passed through the hollow shaft, as described in the preceding embodiment. Fastening screws 46, 47 connect the assemblies after projection 28, 29 has been inserted into receptacle 32, 33. Alternatively or in addition, projection 28, 29 can also be defined in receptacle 32, 33 by pretensioning element 41 which applies a pretensioning force in direction of insertion E. In addition, once two assemblies 5, 6 have been connected, bearing arrangement 24, 25 can be pretensioned in axial direction A by bearing receiving bush 42, 43. This also enables assemblies 5, 6 to be aligned relative to one another or the position of the assemblies to be adjusted in axial direction A if bearing bushes 42, 43 are provided on both sides. Receptacle 32, 33 is formed to be conical so that, in addition to the force-fit connection created by the fastening by the screws, there is also a positive-fit connection during assembly that aligns the assemblies 5, 6 precisely relative to one another.

The connection explained in FIGS. 2 to 5 of two assemblies in a robot according to the invention can be provided not only between the assemblies lower support arm 5 and articulated arm 6 for the fourth joint 10 of robot 1, but also for the other joints of robot 1 or for other types of robots. In particular, a corresponding configuration can also be provided on first joint 7 of the robot for fastening the assembly pivot arm 3 to the assembly base 2, on second joint 8 of robot 1 for fastening the assembly upper support arm 4 on the assembly pivot arm 3, or on third joint 9 between upper support arm 4 and lower support arm 5. With the configuration on third joint 9, in particular only one projection is provided on upper or lower support arm 4, 5, and only one receptacle on the other one of upper and lower support arm 4, 5.

Further fastening of assemblies in robot 1 is shown in FIGS. 6 to 8 using the example of fastening a first assembly in the form of upper support arm 4 to a second assembly in the form of pivot arm 3. Provided on upper support arm 4 on both sides are bearing assemblies 52, 53 which comprise a first fastening element 54, 55 which forms an inwardly directed projection 56, 57.

The second assembly in the form of pivot arm 3 comprises two jaws 58, 59 extending in parallel which represent a second fastening element 60, 61 which is provided with a receptacle 62, 63.

As shown in a sectional view in FIG. 7, respective projection 56, 57 is each inserted into associated receptacle 62, 63. First fastening elements 54, 55 and second fastening elements 60, 61 can then be screwed together. Bearing assemblies 52, 53 each comprise a shaft 64, 65 which is fixedly connected to upper support arm 4 and on which first fastening elements 54, 55 are mounted to be rotatable by way of pivot bearings 66, 67. A pretensioning bush 68 can be provided on one or both sides with which the pretension of pivot bearings 66, 67 in axial direction A can be adjusted.

First fastening element 55 is shown in FIG. 8 in a top view in axial direction A. Projection 57 in its lower region is embodied in the shape of a graduated circle and is therefore complementary to the configuration of receptacle 63 as an arc. Furthermore, the projection can also comprise abutment surface 69 shown in FIG. 8 which comes into abutment with an abutment surface 70 of second fastening element 61 and as a stop thereby prevents a relative rotation between projection 57 and receptacle 63. Abutment surfaces 69, 70 extend tangentially or at an angle to the circumferential direction of the arc.

In the embodiment according to FIGS. 6 to 8, projection 56, 57 extends in the outer region on the inner assembly in the form of upper support arm 4. In particular, projection 56, 57 is provided axially inside on first fastening element 54, 55 arranged axially outside. Shafts 64, 65 are each configured as a solid shaft and separately, although a continuous shaft can alternatively be provided. Once their fastening elements 54, 55, 60, 61 have been slid together, assemblies 3 and 4 are fastened from the outside by way of a screw connection. The bearing arrangement can then be pretensioned by way of pretensioning bush 68. This also enables the assemblies to be aligned relative to one another. Positioning is effected by way of the seat of pivot bearings 66, 67 in fastening element 54, 55. Receptacle 62, 63 is a guide which is implemented in sections as an arc so that, in addition to the force-fit connection, a positive fit aligning the assemblies precisely relative to one another is created by the fastening operation with the screws during the mounting process. The fastening screws are screwed into second fastening elements 60, 61 in axial direction A from the outside through first fastening elements 54, 55.

Projection 56, 57 is configured as a combination of an arc with linear abutment surfaces 69. The positive fit of the arc ensures precise positioning of the axis and the abutment surfaces 69 for an anti-rotation lock.

Fastening two assemblies shown in FIGS. 6 to 8 can also be used on joints other than second joint 8 of robot 1 or for other robots. In particular, the corresponding fastening can also be used for first joint 7 of robot 1 between assembly base 2 and assembly pivot arm 3, for third joint 9 between upper support arm 4 and lower support arm 5, or for fourth joint 10 of robot 1 between lower support arm 5 and articulated arm 6.

The receptacle and the projection can assume any complementary shapes that can be aligned by a positive fit. In the preceding embodiments, the shapes of conically tapering and of a graduated circle were already shown by way of example. Furthermore, dovetail guides or the like can also be used. The positive fit and/or force fit between the projection and the receptacle can only be set during assembly in that the receptacle or the projection is mechanically spread apart or clamped.

Fastening the fastening elements can be effected by a screw connection, as in the previous embodiments. But it is also possible to provide no screw connection and to affix the projection in the receptacle only by clamping force. For this purpose, the projection can be in particular pressed into the receptacle. As a further alternative, a permanent connection can be provided by adhesive bonding. However, there is then no simple disassembly in contrast to the embodiments with the fastening elements being releasably fastened.

The fastening element which is connected to the shaft of the bearing arrangement is advantageously rigidly connected thereto. In the embodiments, a respective fastening element in the form of a projection was firmly connected to the axis. Alternatively, however, a fastening element in the form of a receptacle can also be firmly connected to the shaft. Like in the preceding embodiments, the shaft and the fastening element can be configured as separate components fastened to one another, or also be made of an integral component.

The bearing arrangement can already be formed to be pretensioned in the assembly. Alternatively, pretensioning can be effected only after the fastening elements have been fastened, as shown in the preceding embodiments. Suitable types of bearings can be used for all pivot bearings, for example, any type of rolling bearings and/or sliding bearings. In particular, the bearing arrangement is statically defined only after the first and second fastening elements have been fastened. Prior to that, the bearing arrangement can also be undefined.

According to the first embodiment in FIGS. 2 to 5, the bearing arrangement is provided in axially outer jaws 22, 23 of first assembly 5, wherein first fastening element 26, 27 is configured as a projection 28, 29 and second fastening element 30, 31 as a receptacle 32, 33 on both axially outer sides of the inner second assembly.

In the embodiment according to FIGS. 6 to 8, the bearing arrangement is provided in first assembly 4 which is arranged axially within two jaws 58, 59 of a second assembly 3. First fastening elements 54, 55 are configured as projections 56, 57 which can be rotated relative to first assembly 4 and which are received in receptacles 62, 63 in jaws 58, 59 of second assembly 3. According to FIG. 7, first fastening element 54, 55 is mounted to be rotatable relative to shaft 64, 65. Alternatively, however, shaft 64, 65 can also be mounted to be rotatable relative to first assembly 4, and first fastening element 54, 55 can be arranged fixedly on shaft 64, 65. This is particularly advantageous in designs with a continuous shaft instead of two individual shafts 64, 65.

In further alternative embodiments, the receptacle can be mounted to be rotatable as the first fastening element, namely either on the axial outer sides of the first assembly or on two axial inner sides within jaws which can be formed by the first assembly.

According to the invention, two robot assemblies can be designed with a system of receptacles, for example, guides, and projections, for example rails. The receptacle is there part of the one assembly and the projection is part of the other assembly. Generally, two projections are provided on one assembly and two receptacles are provided on the other assembly, which are each inserted into one another. Alternatively, however, it is also possible for only one receptacle to be provided on one assembly and a projection on the other assembly. In particular, one of the assemblies is provided in sections within the other assembly. The projections can then be provided either on the inside of the outer assembly or on the outside of the inner assembly, and the guides respectively alternatively on the outside of the inner assembly or on the inside of the outer assembly. Either the projections or the receptacles can be rotatable relative to their respective assembly. This means that one of the two fastening elements, the projection or the receptacle, is advantageously mounted to be rotatable and for this purpose contains an axis bearing. The axis bearing can be statically defined before the two assemblies are joined, or it can still be statically undefined and only statically defined when the two assemblies have been assembled.

The invention claimed is:

1. A robot (1) comprising:
a first assembly (4, 5);
a second assembly (3, 6);
wherein said first assembly (4, 5) is a first robotic arm and said second assembly (3, 6) is a second robotic arm, wherein said second robotic arm is connected to said first robotic arm in a manner pivotable about a pivot axis extending in an axial direction (A);
wherein bearing arrangements (24, 25, 52, 53), by which said second robotic arm (3, 6) is configured to be moved relative to said first robotic arm (4, 5), are provided in said first robotic arm (4, 5);
wherein individual ones of said bearing arrangements (24, 25, 52, 53) comprise a first fastening element (26, 27, 54, 55) and rotatably mounted shafts (34, 35, 64, 65);
wherein said second robotic arm (3, 6) comprises a second fastening element (30, 31, 60, 61);
wherein said first fastening element (26, 27, 54, 55) or said second fastening element (30, 31, 60, 61) forms a receptacle (32, 33, 62, 63), and the other of said first fastening element (26, 27, 54, 55) and said second fastening element (30, 31, 60, 61) forms a projection (28, 29, 56, 57), and wherein for fastening, said projection (28, 29, 56, 57) is configured to be inserted into said receptacle (32, 33, 62, 63) in a direction of insertion (E);
wherein said projection (28, 29, 56, 57) is configured to be inserted into said receptacle (32, 33, 62, 63) substantially orthogonally relative to said axial direction (A);
and wherein said projection (28, 29, 56, 57) has a conical or arcuate configuration in said direction of insertion (E); and
wherein either said first robotic arm (5) is configured at one end with two jaws (22, 23) extending in parallel and at a distance with respect to one another, wherein said second robotic arm (6) is mounted between said two jaws (22, 23), and said rotatably mounted shafts (34, 35) are provided coaxially in both jaws (22, 23), or said second robotic arm (3) includes at one end two jaws (58, 59) extending in parallel and at a distance with respect to one another, wherein said first robotic arm (4) is mounted between said two jaws (58, 59), and the ends of at least one of said rotatably mounted shafts (64, 65) arranged in said first robotic arm (4) are provided coaxially on outer sides of said first robotic arm (4).

2. The robot according to claim 1, wherein a pretensioning element (41) is provided which is adapted to apply a pretension to said projection (28, 29, 56, 57) in said direction of insertion (E).

3. The robot according to claim 1, wherein said receptacle (32, 33) is a guide and said projection (28, 29) is a rail.

4. The robot according to claim 1 wherein said projection (56, 57) has, at least in sections, the shape of a graduated circle and said receptacle (62, 63) is, at least in sections, of the shape of an arc.

5. The robot according to claim 1, wherein said rotatably mounted shafts (34, 35) are mounted in said first robotic arm (5) to be rotatable about the pivot axis, and wherein said first fastening element (26, 27) is fastened on said rotatably mounted shafts (34, 35) or said first fastening element (26, 27) is integral with said rotatably mounted shafts (34, 35).

6. The robot according to claim 1, wherein at least one of the rotatably mounted shafts (34, 35) is configured as a hollow shaft, and at least one cable and/or at least one fastening screw (46, 47) extends through an interior of said hollow shaft.

7. A method for mounting two assemblies (5, 6), comprising two robotic arms of a robot (1), the method comprising:
providing a first robotic arm (5) which is configured at one end with two jaws (22, 23) extending in parallel and at a distance with respect to one another with a projection (28, 29) in which shafts (34, 35) mounted to be rotatable are provided coaxially;
providing a second robotic arm (6) with a receptacle (32, 33);
mounting said second robotic arm (6) between said jaws (22, 23) of said first robotic arm (5);
wherein said projection (28, 29) is configured to be rotated relative to said first robotic arm (5) about a pivot axis;
inserting said projection (28, 29) in a linear direction of insertion (E) into said receptacle (32, 33), wherein said projection (28, 29) has a conical configuration in said direction of insertion (E); and
fastening said projection (28, 29) in said receptacle (32, 33).

8. The method according to claim 7, wherein fastening said projection (28, 29, 56, 57) in said receptacle (32, 33, 62, 63) comprises pretensioning in said direction of insertion (E).

9. A method for mounting two bearing arrangements (2, 3,4) comprising two robotic arms of a robot (1), the method comprising:
providing a first robotic arm (4) with a projection (56, 57), wherein the ends of at least one shaft (64, 65) arranged in said first robotic arm (4) are provided coaxially on outer sides of said first robotic arm (4);
providing a second robotic arm (3) which is configured at one end with two jaws (58,59) extending in parallel and at a distance with respect to one another, wherein the second robotic arm (3) is configured with a receptacle (62, 63);
wherein said projection (56, 57) is adapted to be rotated relative to said first robotic arm (4) about a pivot axis;
mounting said first robotic arm (4) between said jaws (58, 59) of said second robotic arm (3);
inserting said projection (56, 57) in a linear direction of insertion (E) into said receptacle (62, 63);
wherein said projection (56, 57) is configured to be inserted into said receptacle (62, 63) substantially orthogonally relative to said pivot axis;
wherein said projection (56, 57) has a conical or arcuate configuration in said direction of insertion (E); and
fastening said projection (56, 57) in said receptacle (62, 63).

10. The method according to claim 9, wherein fastening said projection (28, 29, 56, 57) in said receptacle (32, 33, 62, 63) comprises pretensioning in said direction of insertion (E).

* * * * *